(12) United States Patent
Wildfang (10) Patent No.: US 10,006,574 B2
(45) Date of Patent: Jun. 26, 2018

(54) HOSE COUPLING (71) Applicant: Neoperl GmbH, Mullheim (DE)

(72) Inventor: Fabian Wildfang, Mullheim (DE)

(73) Assignee: Neoperl GmbH, Müllheim (DE)

( * ) Notice: Subject to any disclaimer, the term of this patent is extended or adjusted under 35 U.S.C. 154(b) by 86 days.

(21) Appl. No.: 15/102,065

(22) PCT Filed: Sep. 17, 2014

(86) PCT No.: PCT/EP2014/002518
§ 371 (c)(1),
(2) Date: Jun. 6, 2016

(87) PCT Pub. No.: WO2015/086097
PCT Pub. Date: Jun. 18, 2015

(65) Prior Publication Data
US 2016/0305589 A1    Oct. 20, 2016

(30) Foreign Application Priority Data
Dec. 13, 2013  (DE) .................... 20 2013 010 988 U (51) Int. Cl.
*F16L 25/00* (2006.01)
*F16L 37/084* (2006.01)
*E03C 1/02* (2006.01)
E03C 1/04 (2006.01)

(52) U.S. Cl.
CPC .......... *F16L 37/0841* (2013.01); *E03C 1/025* (2013.01); *E03C 2001/0415* (2013.01)

(58) Field of Classification Search
CPC .................................... F16L 37/0841

USPC .................................................. 285/317, 383
See application file for complete search history.

(56) References Cited

U.S. PATENT DOCUMENTS

| 3,538,940 | A | * | 11/1970 | Graham | .................. F16K 27/00 |
| | | | | | 137/271 |
| 4,804,213 | A | * | 2/1989 | Guest | .................... F16L 37/092 |
| | | | | | 285/308 |
| 5,171,045 | A | * | 12/1992 | Pasbrig | ................. F16L 33/227 |
| | | | | | 285/308 |
| 5,743,291 | A | | 4/1998 | Nehm et al. | |
| 6,986,533 | B2 | * | 1/2006 | Ko | ...................... F16L 37/0925 |
| | | | | | 285/313 |

(Continued)

FOREIGN PATENT DOCUMENTS

DE          20104948      5/2001
DE        202011100476    9/2011

(Continued)

*Primary Examiner* — Aaron M Dunwoody
(74) *Attorney, Agent, or Firm* — Volpe and Koenig, P.C.

(57) ABSTRACT

The invention relates to a hose coupling (5) for connecting a flexible hose line (3) to an adjacent line section (6). The hose coupling (5) according to the invention has a coupling housing (7), which coupling housing (7) has at least two coupling openings (8, 9), into each of which a respective coupling mating piece (10, 11) can be inserted and releasably fixed, which coupling mating pieces (10, 11) are designed as line ends of a line section, and of which at least one coupling mating piece is provided as the line end of a flexible hose line (3), wherein the coupling openings (8, 9) in the coupling housing (7) are connected to each other.

20 Claims, 7 Drawing Sheets (56) References Cited

U.S. PATENT DOCUMENTS

| | | | | |
|---|---|---|---|---|
| 7,823,625 B2* | 11/2010 | Gammons | ........... | F16L 37/0841 |
| | | | | 165/46 |
| 8,882,156 B2* | 11/2014 | Guest | .................... | F16L 37/101 |
| | | | | 285/322 |
| 2013/0300108 A1* | 11/2013 | Frick | ................... | F16L 37/0841 |
| | | | | 285/319 |

FOREIGN PATENT DOCUMENTS

| | | |
|---|---|---|
| EP | 0787864 | 8/1997 |
| WO | 0053966 | 9/2000 |

\* cited by examiner

HOSE COUPLING

BACKGROUND

The invention relates to a hose coupling.

It is known that sanitary fittings normally have a mixer tap in which a cold water supply line and/or a hot water supply line are attached. Sanitary devices are also known in which pull-out sprays are used, in which the water is guided through a flexible hose inside the fitting and which are connected to the mixer tap outlet. Generally speaking, arrangements of this kind are already known fittings with a pull-out water outlet, for example pull-out kitchen sprays or handheld showers.

In the use of pull-out sprays, the connection between mixer tap outlet and spray hose is often effected by means of a pipe, which is generally made of metallic materials, for example copper, or from dimensionally rigid plastic, on which corresponding coupling parts have to be mounted. Thus, assembly by the manufacturer involves time-consuming and costly work steps, for example soldering in the case of metallic materials. Moreover, disassembly can likewise be carried out only with considerable effort.

Connections that are held by means of crimped connections or crimped screw unions are also known to a person skilled in the art. However, such crimped connections have the disadvantage that they often only have inadequate leak-tightness, as a result of which it is sometimes possible for serious damage to occur in the area of the installation. Moreover, disassembly can be carried out only with considerable effort. In the usually confined spaces in question, the high torques generally needed in crimped screw unions can only be applied, if indeed at all, under difficult conditions, and in this case they likewise require considerable effort. It is also known that the confined spaces further entail the disadvantage that the routing of the pull-out spray hoses through the fitting can likewise be effected only with considerable effort.

Given the existence of various country-specific legal requirements, for example concerning permissible materials, required flow rates, and the necessary safety measures governing drinking water, the manufacturer of the fittings additionally faces a not inconsiderable logistical outlay in designing the respective fittings in such a way that the various requirements are fulfilled.

SUMMARY

Therefore, the object of the present invention is in particular to make available a hose coupling which is of the type mentioned at the outset and by which even the untrained user, even in confined spaces, is easily able to connect a flexible hose line to at least one adjacent line section.

This object is achieved by a hose coupling with one or more of the features of the invention.

The hose coupling according to the invention can be inserted between a flexible hose line and at least one adjacent line section. For this purpose, the hose coupling has a coupling housing, which coupling housing has at least two coupling openings which are connected to each other in the coupling housing. A respective coupling mating piece can be inserted and releasably fixed in each of the coupling openings. These coupling mating pieces of the hose coupling according to the invention are each designed as a line end of a line section, wherein at least one of these line sections is formed by the hose line.

In a particularly simple and space-saving embodiment according to the invention, provision is made that the preferably sleeve-shaped coupling housing has a coupling opening on the face of each of its sleeve ends. A sleeve-shaped coupling housing is comparatively compact and favors simple assembly and disassembly, even in confined spaces. Since the coupling openings are arranged on the face of the housing ends, the associated line sections can be connected practically in a continuation of each other.

In a further embodiment of the invention, in order to favor simple assembly and disassembly even without tools, provision is made that a holding element is assigned to each coupling opening, which holding elements are movable between an unlocking position and a locking position, in which locking position the holding element in question fixes the associated coupling mating piece in the coupling opening.

In an embodiment of the invention that is particularly easy to handle, provision is made that at least one holding element is movable from the locking position to the unlocking position by applying pressure preferably counter to a restoring force.

Moreover, in order to be able to operate the hose coupling according to the invention with one hand, it is advantageous if the coupling housing is designed to be grasped in one hand, and if in doing so at least one holding element can be actuated with the thumb of this hand. In this embodiment, the other hand remains free, for example to be able to insert the hose end with its coupling mating piece into the corresponding coupling opening of the hose coupling according to the invention.

In an embodiment of the invention that is particularly easy to handle and that can also be operated by untrained users without tools, provision is made that at least one holding element is designed as a holding slide, which is guided movably between the unlocking position and the locking position in a slide channel that is oriented transversely with respect to the direction of insertion of the coupling mating piece and that passes through the associated coupling opening.

To be able to exert a corresponding restoring force on the holding element, it is advantageous if, on at least one holding slide, at least one resilient web is integrally formed which serves to provide the restoring force and which, when pressure is applied to the holding slide, bears with its free web end against the housing and is pretensioned via elastic deformation. In this embodiment, the at least one resilient web integrally formed on the holding slide is elastically deformed and pretensioned in such a way that, when pressure is released, this holding slide is able to move from the unlocking position to the locking position as a result of the restoring force exerted by the resilient web.

To make the hose coupling according to the invention easier to handle and to give the user feedback when the coupling mating piece of a hose line latches safely and firmly in the assigned coupling opening, it is advantageous if the restoring force acts on the holding element in such a way that, when the pressure is released and the coupling mating piece is inserted into the coupling opening, the holding element can be clearly heard to spring back from the unlocking position to the locking position.

The actuation of the holding element designed as a holding slide is made much easier if at least one slide end of the holding slide is designed as an actuating button, and if this actuating button is arranged for actuation laterally on the coupling housing and preferably in a button seat.

To be able to fix the coupling mating piece securely in the assigned coupling opening on the coupling housing of the hose coupling according to the invention, it is advantageous if, on at least one coupling mating piece, an undercut is provided, behind which the holding element engages in the locking position.

To ensure that the coupling mating piece can be inserted into the assigned coupling opening of the coupling housing in any desired position of rotation and can be fixed there, it is advantageous if, on at least one coupling mating piece, a peripheral annular shoulder is provided, which forms the undercut.

The coupling mating piece provided at the hose end of a flexible hose line can be inserted particularly easily and with little effort in the assigned coupling opening of the hose coupling according to the invention if at least one of the holding slides has a plug-through opening, and if a run-on bevel is provided on the coupling mating piece and/or on the edge area of the holding slide surrounding the plug-through opening, by means of which run-on bevel an insertion movement of the coupling mating piece into the plug-through opening is converted into a sliding movement of the holding slide from the locking position to the unlocking position. In this embodiment, the coupling mating piece only has to be pushed into the coupling opening, and into the plug-through opening of the holding slide provided in the area of the coupling opening, so that the holding slide, after reaching the unlocking position, can engage preferably clearly audibly behind the undercut on the coupling mating piece and secure it.

The simple production of the hose coupling according to the invention is further favored if the coupling housing is designed as a plastics injection-molded part and/or if at least one coupling mating piece is made from metal and in particular from brass.

The hose coupling according to the invention can also be used to influence the power characteristics and/or the direction of flow of the water flowing through it. For this purpose, in a preferred embodiment according to the invention, provision is made that at least one sanitary insert cartridge can be inserted in the coupling housing, between the coupling openings, and that the at least one sanitary insert cartridge is designed as a flow regulator, flow restrictor and/or as a check valve. The insert cartridge can have one of the stated functions or any desired number of these functions.

Particularly if the hose coupling according to the invention contains a check valve, it can be advantageous if the coupling openings are configured differently for the insertion of only the assigned and correspondingly shaped coupling mating piece. In this embodiment, the coupling mating pieces to be connected to each other are differently configured such that they can fit only into the coupling opening assigned to them. Since it is thus not possible to insert the coupling mating pieces the wrong way, a wrongly rotated insertion of the hose coupling is avoided.

By contrast, in another advantageous embodiment according to the invention, provision is made that the coupling openings are provided for the alternate insertion of one or the other correspondingly shaped coupling mating piece and, for this purpose, are of preferably identical configuration. In this embodiment, each of the coupling mating pieces can be inserted into each of the coupling openings on the hose coupling according to the invention.

In order to connect the hose coupling according to the invention to the line end of an adjacent supply line, it can be advantageous if, in the area of at least one coupling opening, at least one ring seal is provided which provides a seal between the inner circumference of the coupling housing and the coupling mating piece pushed into this coupling opening. In this embodiment, leakages in the area of the coupling opening are safely avoided.

To be able to secure the ring seal captively in the hose coupling according to the invention, it is advantageous if the at least one ring seal is secured axially between an annular shoulder provided on the inner circumference of the housing and an insertion sleeve, which insertion sleeve can be inserted into the coupling opening and can be fixed on the inner circumference of the housing.

Since the supply line may be exposed to particular loads, especially in the area of the hose coupling, it is advantageous if at least one stiffening rib is provided on the outer circumference of the housing, and if preferably at least one of the stiffening ribs connects the button seats to each other. Such a stiffening rib counteracts transverse loads which can act on the coupling housing transversely with respect to the longitudinal extent of the hose coupling according to the invention.

BRIEF DESCRIPTION OF THE DRAWINGS

Developments according to the invention will become clear from the drawing in conjunction with the claims and with the description of the figures. A preferred illustrative embodiment of the invention is described in more detail below with reference to the drawing, in which:

DETAILED DESCRIPTION OF THE PREFERRED EMBODIMENTS

Figure 1:
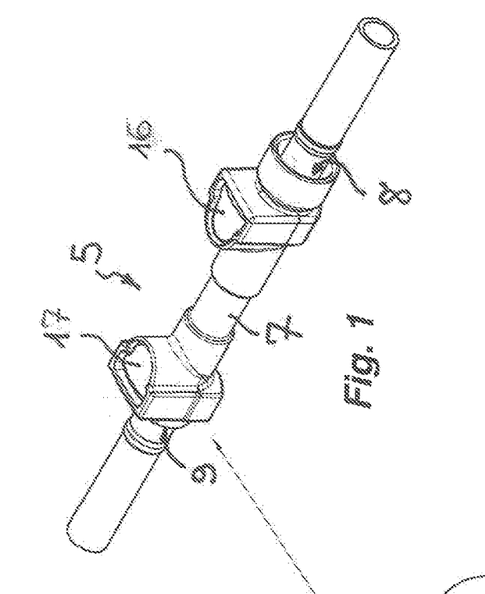
FIG. 1 shows a perspective view of a hose coupling, which here serves to connect two flexible hose lines, of which at least one hose line forms the pull-out hose of a sanitary outlet fitting designed as a pull-out spray.
Figure 2:
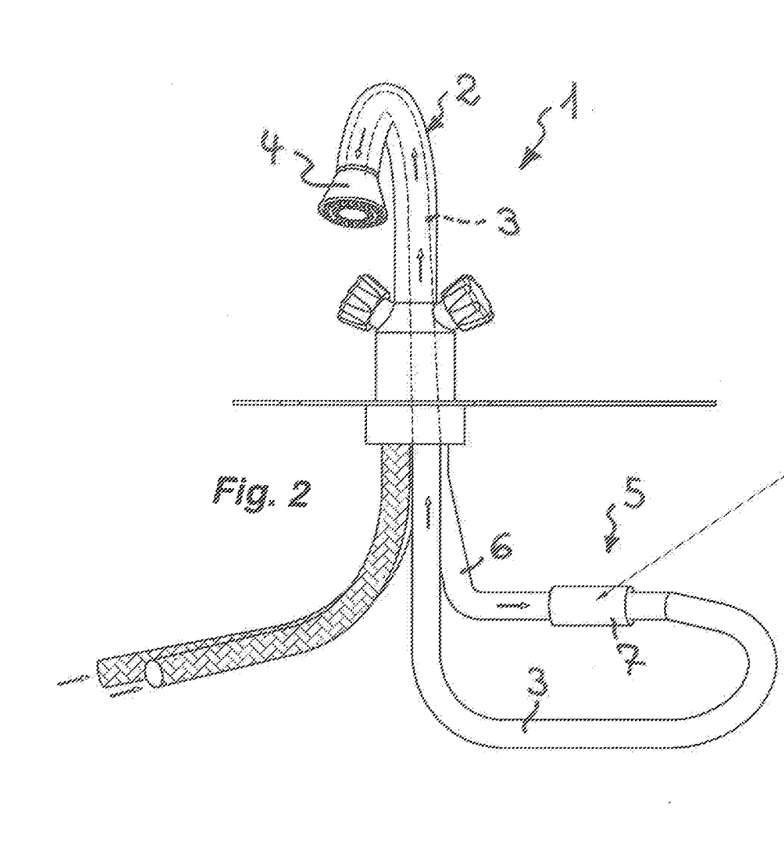
FIG. 2 shows the outlet fitting designed as pull-out spray, with the hose coupling shown in FIG. 1.

FIG. 2 shows a sanitary outlet fitting 1, which is designed as a pull-out spray or as a kitchen spray. The outlet fitting 1 has an outlet pipe 2, in which a flexible hose line 3 is guided movably, in such a way that this hose line 3 can be pulled out of or also pushed into the outlet pipe 2, until the spray head 4 provided on the outer hose end and serving as water outlet abuts against the pipe end of the outlet pipe 2.

It will be seen in FIG. 2 that the hose line 3 guided movably in the outlet pipe 2 can be connected to an adjacent line section 6 via a hose coupling 5. This adjacent line section 6 can be designed as an attachment nozzle, as a dimensionally stable conduit pipe or, as in the present case, likewise as a flexible hose line.

The hose coupling 5 shown in more detail in FIGS. 1 to 18 can be inserted between the flexible hose line 3 and the at least one adjacent line section 6. For this purpose, the hose coupling 5 has a coupling housing 7, which has at least two coupling openings 8, 9 connected to each other in the coupling housing 7. In each of the coupling openings 8, 9, a coupling mating piece 10 or 11 can be respectively inserted and releasably fixed. These coupling mating pieces 10, 11 of the hose coupling 5 are each designed as a line end of a line section 3, 6, wherein at least one line section is formed by the flexible hose line 3.

It will be seen in FIGS. 1 and 3 to 18 that the coupling housing 7 has a coupling opening 8, 9 on the face of each of its sleeve ends. A holding element 12, 13 is assigned to each coupling opening 8, 9. These holding elements 12, 13 are movable between an unlocking position and a locking position, in which locking position the holding element 12, 13 in question fixes the associated coupling mating piece 10, 11 in the coupling opening 8, 9.

The holding elements 12, 13 are here designed as holding slides, which are each guided movably between the unlocking position and the locking position in a slide channel 14, 15 that is oriented transversely with respect to the direction of insertion of the coupling mating piece 10, 11 and that passes through the respective coupling opening 8, 9. At their one slide end that can be acted on laterally on the coupling housing 7, the holding slides serving as holding elements 12, 13 are each designed as an actuating button 16, 17, which is arranged there in a protected manner in a button seat 18, 19 of the coupling housing 7.

The coupling mating pieces 10, 11 shown here have an undercut, behind which the associated holding element 12, 13 engages in the locking position. This undercut is designed as a peripheral annular shoulder 20, 21, which annular shoulder can be formed by an annular flange 22, protruding radially on the coupling mating piece 10, 11, or by an annular groove 23.

Figure 8:
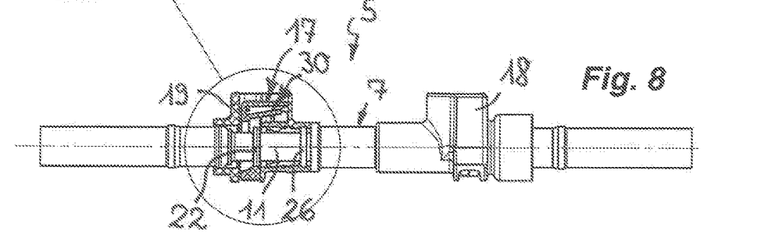
FIG. 8 shows the hose coupling from FIGS. 1 to 7 in a partial longitudinal section, wherein the holding slide assigned to one coupling opening is located in an unlocking position.
Figure 9:
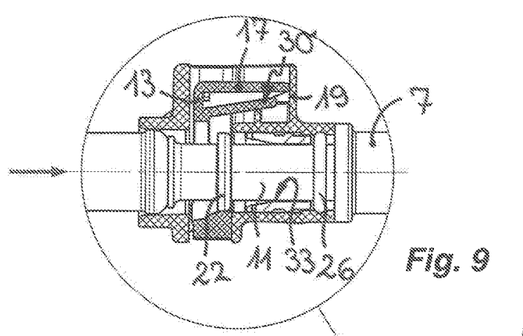
FIG. 9 shows the hose coupling from FIG. 8 in a detailed longitudinal section, in the area of the coupling opening having the holding slide located in its unlocking position.
Figures 10, 11:
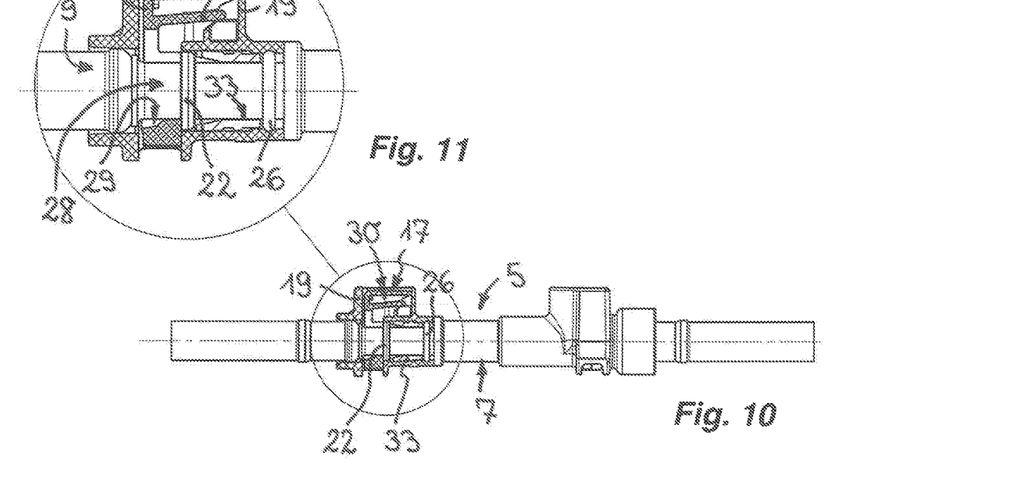
FIG. 10 shows the hose coupling from FIGS. 1 to 9 in a partial longitudinal section, wherein one of the holding elements designed here as holding slides is located in its locking position.
FIG. 11 shows the hose coupling from FIG. 10 in a detailed longitudinal section, in the area of the coupling opening having the holding slide located in its locking position.
Figures 12, 13, 14, 15, 16, 17:
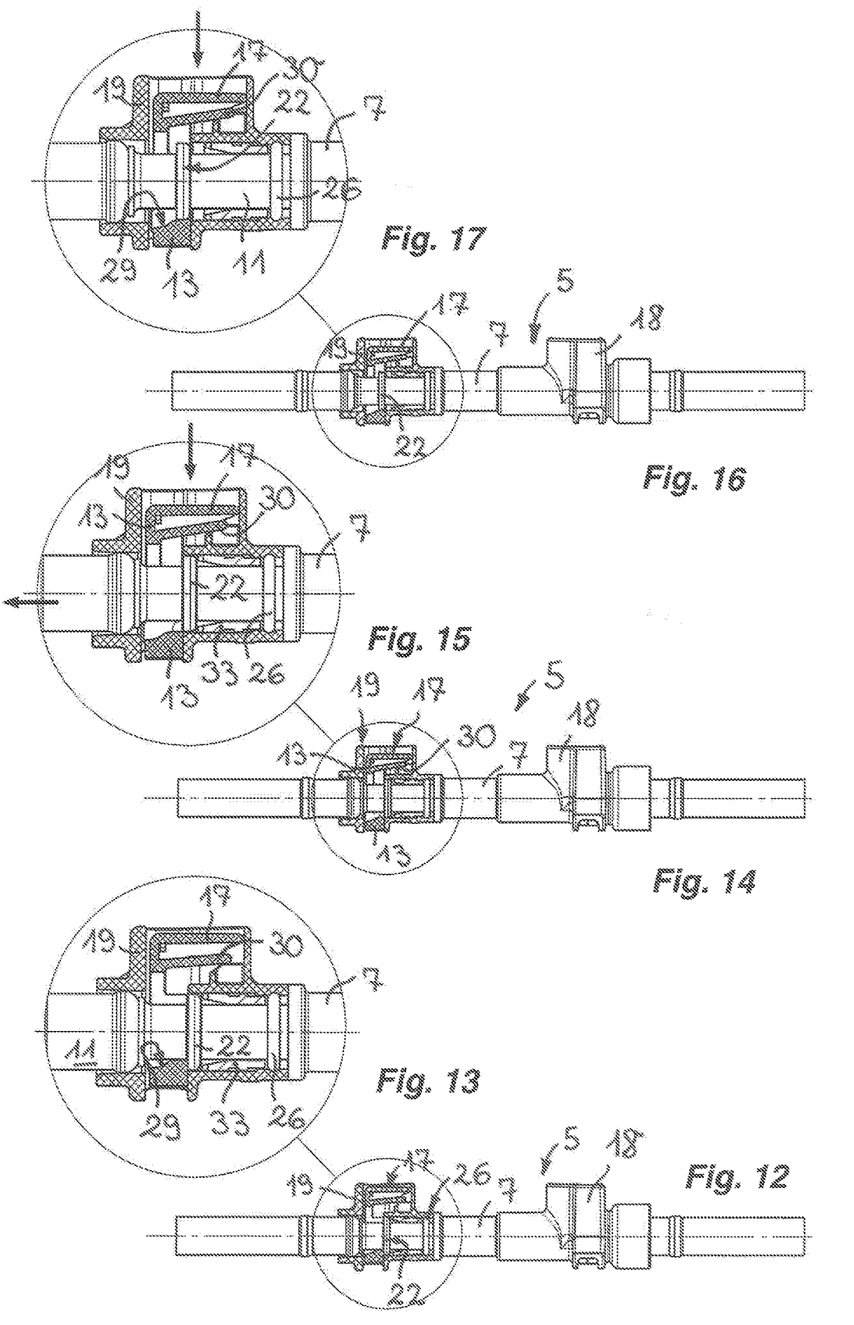
FIG. 12 shows the hose coupling from FIGS. 1 to 11 in a partial longitudinal section, wherein the holding slide is located in its locking position, in which it engages behind a peripheral undercut on the outer circumference of a coupling mating piece.
FIG. 13 shows the hose coupling from FIG. 12 in a detailed longitudinal section, in the area of the coupling opening having the holding slide located in its locking position.
FIG. 14 shows the hose coupling from FIGS. 1 to 13 in a partial longitudinal section, wherein the holding slide is pressed into an unlocking position counter to a restoring force in such a way that the corresponding coupling mating piece provided at the hose end of a flexible hose line can be removed from the associated coupling opening of the hose coupling.
FIG. 15 shows the hose coupling from FIG. 14 in a detailed longitudinal section, in the area of the coupling opening having the holding slide pressed into its unlocking position.
FIG. 16 shows the hose coupling from FIGS. 1 to 15 in a partial longitudinal section, wherein the coupling mating piece has already been pulled slightly out of the coupling opening.
FIG. 17 shows the hose coupling from FIG. 16 in a detailed longitudinal section, in the area of the holding slide already pulled slightly out of the coupling opening.
Figure 18:
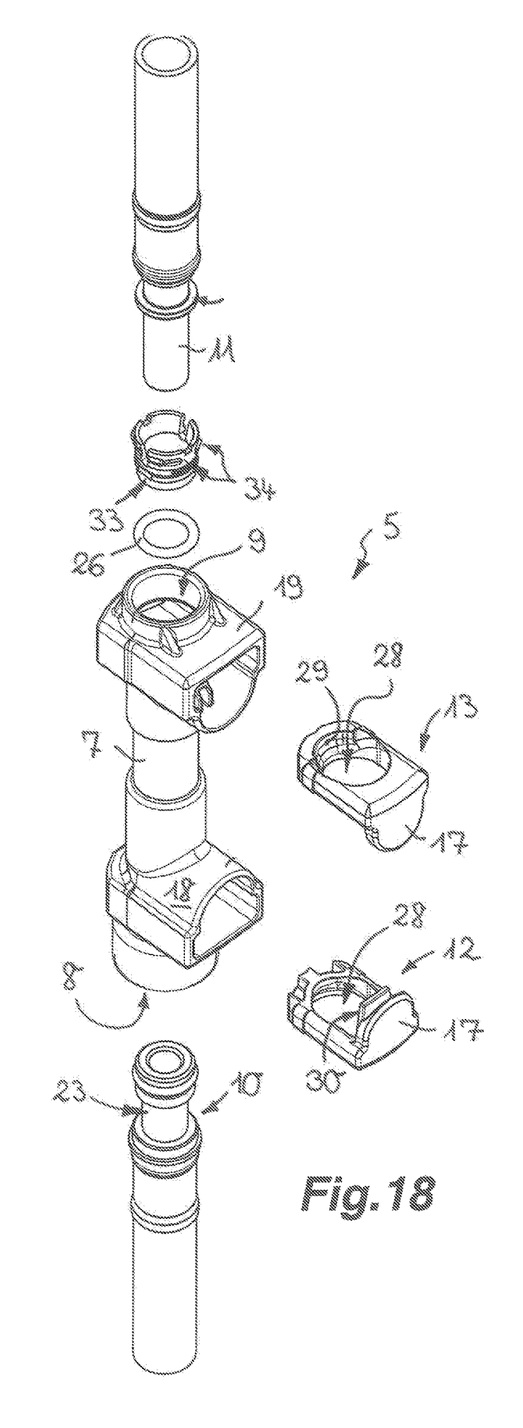
FIG. 18 shows the hose coupling from FIGS. 1 to 17 in an exploded perspective view of its component parts.

The holding elements 12, 13 designed here as holding slides are movable from the locking position, shown for example in FIGS. 11 to 13, to the unlocking position, shown in FIGS. 14 to 17, by applying pressure counter to a restoring force. Each of the holding elements 12, 13 designed as holding slides has a plug-through opening 28. A run-on bevel 29 is provided on the edge area of the holding slides 12, 13 surrounding the plug-through opening 28 and directed toward the coupling opening 8 or 9, by means of which run-on bevel 29, as can be seen in FIGS. 8 and 9, an insertion movement of the coupling mating piece 10 or 11 into the plug-through opening 28 is converted into a sliding movement of the holding slide 12 or 13 from the locking position to the unlocking position counter to the restoring force. The restoring force acts on the holding element 12, 13 in such a way that, when the pressure is released and the coupling mating piece 10, 11 is inserted into the coupling opening 8, 9, the holding element 12, 13 can be clearly heard to spring back from the unlocking position to the locking position.

On each holding element 12, 13 designed as holding slide, at least one resilient web 30 is integrally formed which serves to provide a restoring force. From a comparison between FIGS. 4 and 5 on the one hand and FIGS. 8 and 9 on the other hand, it will be clearly seen that, when pressure is applied manually to the holding slide, the resilient web 30 bears with its free web end against the coupling housing 7 and is pretensioned via elastic deformation. This pretensioning is canceled again when the holding slide springs back to its locking position.

The coupling housing 7 and the holding elements 12, 13 designed as holding slides are designed here as plastics injection-molded parts. The coupling mating pieces 10, 11 are produced as metal turned parts, preferably from brass. It will be seen in FIG. 3 that at least one cartridge seat 24 for receiving at least one sanitary insert cartridge 25 is provided in the coupling housing 7, between the coupling openings 8, 9, wherein the at least one insert cartridge 25 can be inserted into the coupling housing 7 from the direction of one of the coupling openings 8. The sanitary insert cartridge has a flow regulator, a flow restrictor or, as in the present case, a check valve, which prevents an undesired backflow of the water flowing through the hose coupling. The illustrative embodiment shown in FIGS. 1 to 18 in this case has two check valves which serve as a double safety feature and which act in the same direction of flow; the check valves each form an insert cartridge 25 and can be pushed through the opposite coupling openings 9 into the coupling housing 7 of the hose coupling 5 until they abut against an annular flange 31.

The hose coupling 7 shown here is designed as a functional double coupling which, for example, can be connected to the output of a mixer tap on the one hand and to the spray hose 3 on the other hand. For this purpose, the hose coupling has two differently configured coupling openings 8, 9, into which correspondingly shaped coupling mating pieces 10, 11 can be inserted. In this way, it is possible to dispense with the use of a dimensionally stable pipe at the output of the mixer tap, and, instead, flexible hoses with a suitable coupling mating piece can be used. This greatly simplifies the assembly and disassembly of the sanitary outlet fitting 1 and of its water attachments, even for the untrained user.

Since the coupling openings 8, 9 are differently configured, incorrect assembly of the hose coupling 5 is prevented. Moreover, on account of the differently configured coupling mating pieces 10, 11, it is not possible to omit the hose coupling 5 and connect the line sections 3, 6 directly by means customary in installation work. The compact configuration of the hose coupling 5 shown here permits simplified assembly without tools, even in confined spaces.

Figure 3:
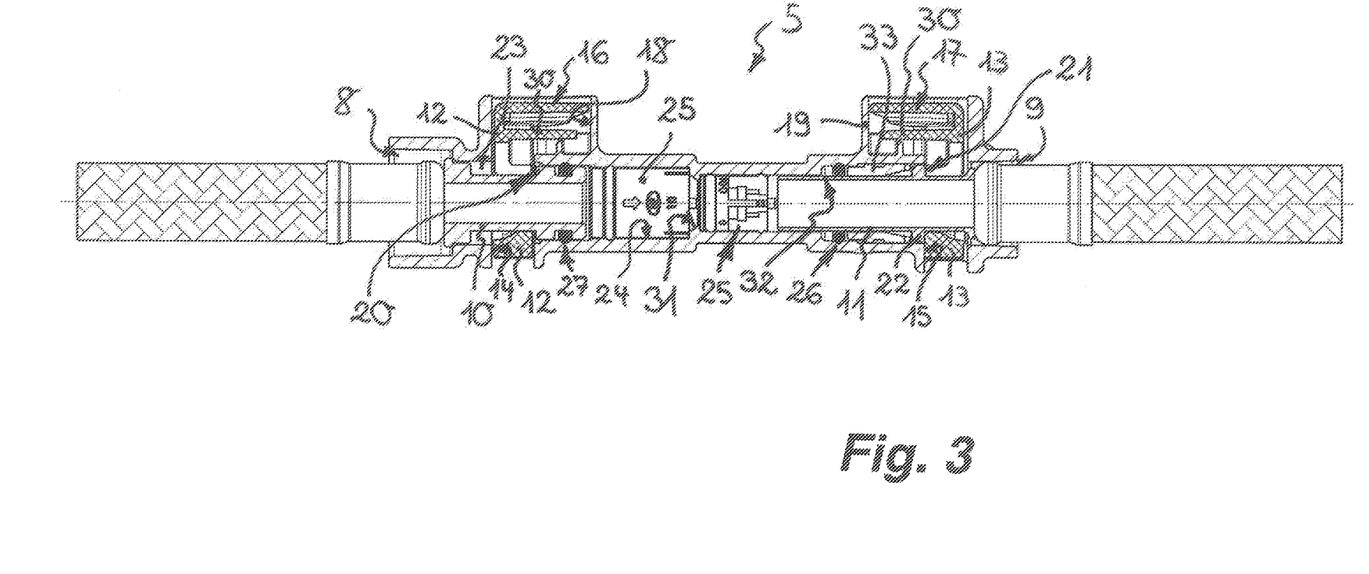
FIG. 3 shows the hose coupling from FIGS. 1 and 2 in an enlarged longitudinal section.
Figures 4, 5:
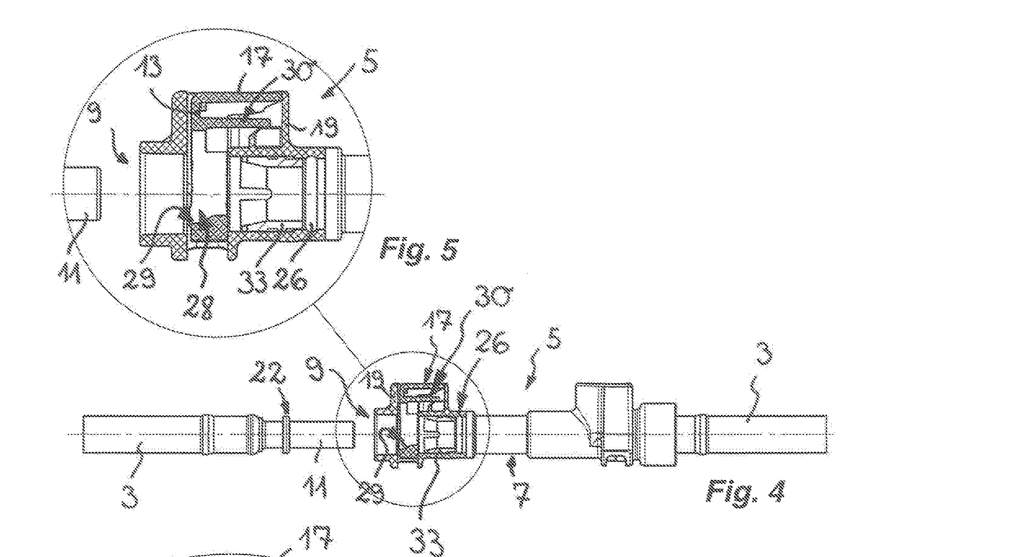
FIG. 4 shows the hose coupling from FIGS. 1 to 3 in a partial longitudinal section, wherein one of the hose lines is removed from the longitudinally sectioned coupling opening.
FIG. 5 shows the hose coupling from FIG. 4 in a detailed view in the area of the longitudinally sectioned coupling opening.
Figure 6:
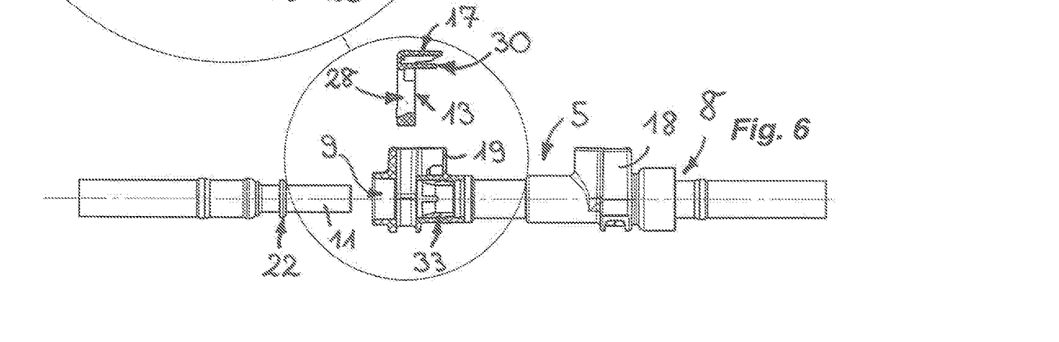
FIG. 6 shows the hose coupling from FIGS. 4 and 5 in an exploded view of its component parts required in the area of one of the coupling openings.
Figure 7:
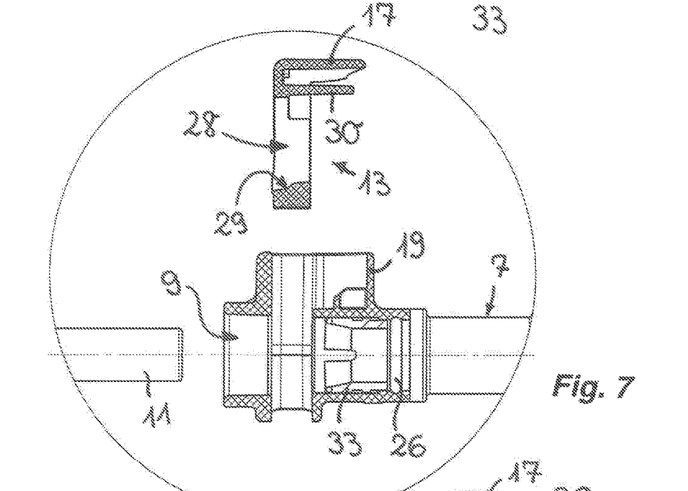
FIG. 7 shows the hose coupling from FIG. 6 in a detailed view in the area of one of the coupling openings.

It will be seen in FIG. 3 that the hose coupling 5 designed as a functional double coupling has coupling openings 8, 9 with a different inside diameter. However, the inside diameters of these coupling openings 8, 9 can also be identical. It will also be seen in FIG. 3 that, in the area of at least one coupling opening 8, 9, at least one ring seal is provided which provides a seal between the inner circumference of the coupling housing 7 and the coupling mating piece pushed into this coupling opening. The ring seal designed here as sealing ring 26, and provided in the coupling opening 9, is secured axially between an annular shoulder 32 provided on the inner circumference of the housing and an insertion sleeve 33, which insertion sleeve 33 can be inserted into the coupling opening 9 and can be fixed on the inner circumference of the housing. Two latching projections 34 spaced apart from each other are provided for this purpose on the insertion sleeve 33 and each engage in a latch recess or a latch opening on the inner circumference of the coupling housing 7. The sealing ring 26 located in the coupling opening 9 has to ensure a tight connection between the coupling mating piece 11 and the coupling opening 9. A coupling mating piece 10 which already has a sealing ring 27 on its outer circumference can be inserted into the coupling opening 8.

In order also to meet the legal requirements, the hose coupling 5 shown here has the cartridge seat 24 for the sanitary insert cartridge 25. However, the insertion of a check valve or of a flow regulator, as already described above, is not absolutely necessary. The hose coupling 5 can have a color coding, preferably as an indicator of insert cartridges 25 inserted in the hose coupling. For this purpose, in the illustrative embodiment shown here, at least one of the holding elements 12, 13 has a paint or dye as color coding on at least the visible side. As a result of this color coding, the manufacturer of the fitting can use the always identical fitting and, in order to meet the requirements specific to each country, can attach the corresponding hose coupling 5, thereby greatly reducing the logistical effort on the part of the manufacturer of the fitting.

Figure 19:
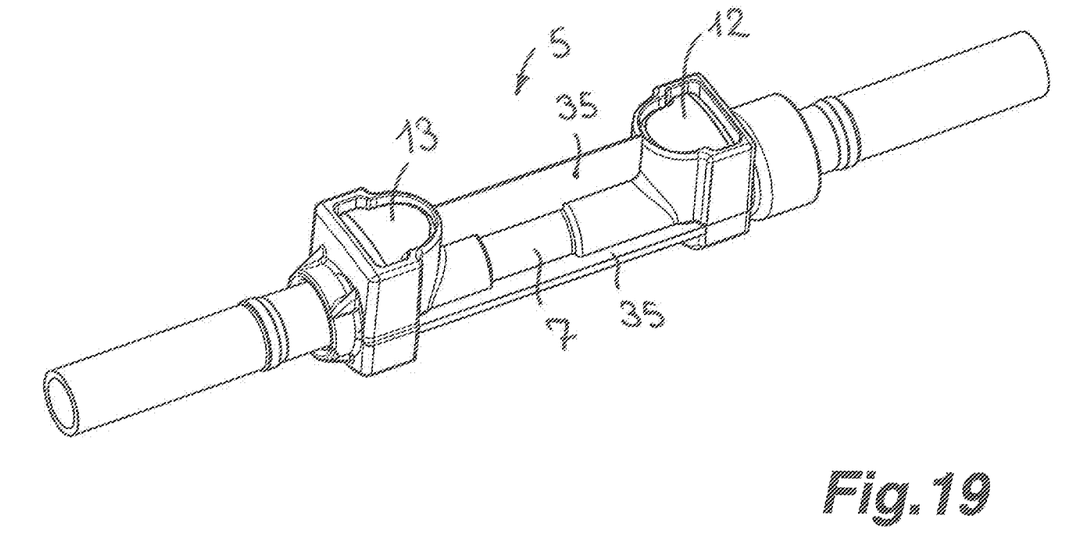
FIG. 19 shows a perspective view of a hose coupling which has a design comparable to the hose coupling shown in FIGS. 1 to 18, but wherein stiffening ribs are provided externally on its coupling housing, which stiffening ribs stiffen the coupling housing of this hose coupling transversely with respect to the longitudinal extent of the housing.

FIG. 19 shows a further embodiment, which largely corresponds to the hose coupling 5 in FIGS. 1 to 18. However, the hose coupling 5 shown in FIG. 19 indicates that at least one stiffening rib 35 can be provided on the outer circumference of the housing, and that preferably at least one of the stiffening ribs 35 connects the button seats 18, 19 to each other. The stiffening ribs 35 counteract transverse loads which can act on the coupling housing 7 transversely with respect to the longitudinal extent of the hose coupling 5 shown in FIG. 19.

The hose coupling 5 presented here is shown for connecting the outlet fitting 4 to the mains water supply only by way of example; the use of this hose coupling 5 is not limited simply to the connection of mixer taps and pull-out sprays.

LIST OF REFERENCE SIGNS 1 sanitary outlet fitting
2 outlet pipe
3 flexible hose line
4 spray head
5 hose coupling
6 line section
7 coupling housing
8 coupling opening
9 coupling opening
10 coupling mating piece
11 coupling mating piece
12 holding element
13 holding element
14 slide channel
15 slide channel
16 actuating button
17 actuating button
18 button seat
19 button seat
20 annular shoulder
21 annular shoulder
22 annular flange
23 annular groove
24 cartridge seat
25 insert cartridge
26 sealing ring
27 sealing ring
28 plug-through opening
29 run-on bevel
30 resilient web
31 annular flange
32 annular shoulder
33 insertion sleeve
34 latching projections
35 stiffening rib

The invention claimed is:

1. A hose coupling (5) comprising a coupling housing (7) that has at least two coupling openings (8, 9), into each of which a respective coupling mating piece (10, 11) is insertable and releasably fixed, said coupling mating pieces (10, 11) are line ends of a line section (3, 6), and of which at least one of the coupling mating pieces (10, 11) is provided as the line end of a flexible hose line (3), the coupling openings (8, 9) in the coupling housing (7) are connected to each other, at least one sanitary insert cartridge (25) inserted in the coupling housing (7) between the coupling openings (8, 9), and the at least one sanitary insert cartridge (25) is at least one of a flow regulator or a check valve.

2. The hose coupling as claimed in claim 1, wherein the coupling housing (7) has housing ends and one of the coupling openings (8, 9) is located on a face of each of the housing ends.

3. The hose coupling as claimed in claim 1, further comprising a holding element (12, 13) assigned to each of the coupling openings (8, 9), said holding elements (12, 13)

are movable between an unlocking position and a locking position, in said locking position the respective holding element (12; 13) fixes an associated one of the coupling mating pieces (10; 11) in the coupling opening (8; 9).

4. The hose coupling as claimed in claim 3, wherein the at least one holding element (12, 13) is movable from the locking position to the unlocking position by applying pressure counter to a restoring force.

5. The hose coupling as claimed in claim 4, wherein the coupling housing (7) is designed to be grasped in one hand, and configured so that the at least one holding element (12, 13) is actuatable with a thumb.

6. The hose coupling as claimed in claim 3, wherein the at least one holding element (12, 13) comprises a holding slide, which is guided movably between the unlocking position and the locking position in a slide channel (28) that is oriented transversely with respect to a direction of insertion of the coupling mating piece (10, 11) and that passes through the associated coupling opening (8, 9).

7. The hose coupling as claimed in claim 6, wherein at least one slide end of the holding slide is designed as an actuating button (16, 17), and said actuating button (16, 17) is arranged for actuation laterally on the coupling housing (7).

8. The hose coupling as claimed in claim 7, there are two of the actuating buttons arranged for actuation laterally on the coupling housing in button seats, a stiffening rib (35) is provided on an outer circumference of the housing, and the stiffening rib (35) connects the button seats (18, 19) to each other.

9. The hose coupling as claimed in claim 6, on at least one of the holding slides, at least one resilient web (30) is integrally formed which serves to provide a restoring force and which, when pressure is applied to the holding slide, bears with a free web end against the coupling housing (7) and is pretensioned via elastic deformation.

10. The hose coupling as claimed in claim 9, wherein the restoring force acts on the holding element (12, 13) in such a way that, when the pressure is released and the coupling mating piece (10, 11) is inserted into the coupling opening (8, 9), the holding element (12, 13) generates an audible sound upon springing back from the unlocking position to the locking position.

11. The hose coupling as claimed in claim 6, wherein at least one of the holding slides has a plug-through opening (28), and a run-on bevel (29) is provided on at least one of the coupling mating piece (10, 11) or on an edge area of the holding slide surrounding the plug-through opening (28), and by said run-on bevel (29) an insertion movement of the coupling mating piece (10, 11) into the plug-through opening (28) is converted into a sliding movement of the holding slide from the locking position to the unlocking position.

12. The hose coupling as claimed in claim 6, wherein the coupling openings (8, 9) are configured differently for insertion of only an assigned and correspondingly shaped one of the coupling mating pieces (10, 11).

13. The hose coupling as claimed in claim 3, wherein on at least one of the coupling mating pieces, an undercut is provided, behind which the associated holding element (12, 13) engages in the locking position.

14. The hose coupling as claimed in claim 13, wherein on at least one of the coupling mating pieces (10, 11), a peripheral annular shoulder (20, 21) is provided, which forms the undercut.

15. The hose coupling as claimed in claim 3, wherein each of the coupling mating pieces (10, 11) is provided as a line end of a flexible hose line.

16. The hose coupling as claimed in claim 1, wherein at least one of the coupling housing (7) is a plastics injection-molded part, or at least one coupling mating piece (10, 11) is made from metal.

17. The hose coupling as claimed in claim 1, wherein the coupling openings (8, 9) are provided for alternate insertion of either of the coupling mating pieces (10, 11) that are shaped correspondingly.

18. The hose coupling as claimed in claim 1, wherein in an area of at least one of the coupling openings (9), at least one ring seal is provided which provides a seal between an inner circumference of the coupling housing (7) and the coupling mating piece (11) pushed into said coupling opening (9).

19. The hose coupling as claimed in claim 18, wherein the at least one ring seal is secured axially between an annular shoulder (32) provided on the inner circumference of the coupling housing and an insertion sleeve (33), said insertion sleeve (33) is inserted into the coupling opening (9) and fixed on the inner circumference of the coupling housing (7).

20. The hose coupling as claimed in claim 1, wherein the hose coupling has a color coding as an indicator of the insert cartridges (25) inserted in the hose coupling, and at least one of the holding elements (12, 13) has a paint or dye as color coding on at least a visible side.

* * * * *